Sept. 1, 1931.    H. R. STUART    1,821,123
OSCILLATING MOTOR
Filed July 21, 1928    3 Sheets-Sheet 1
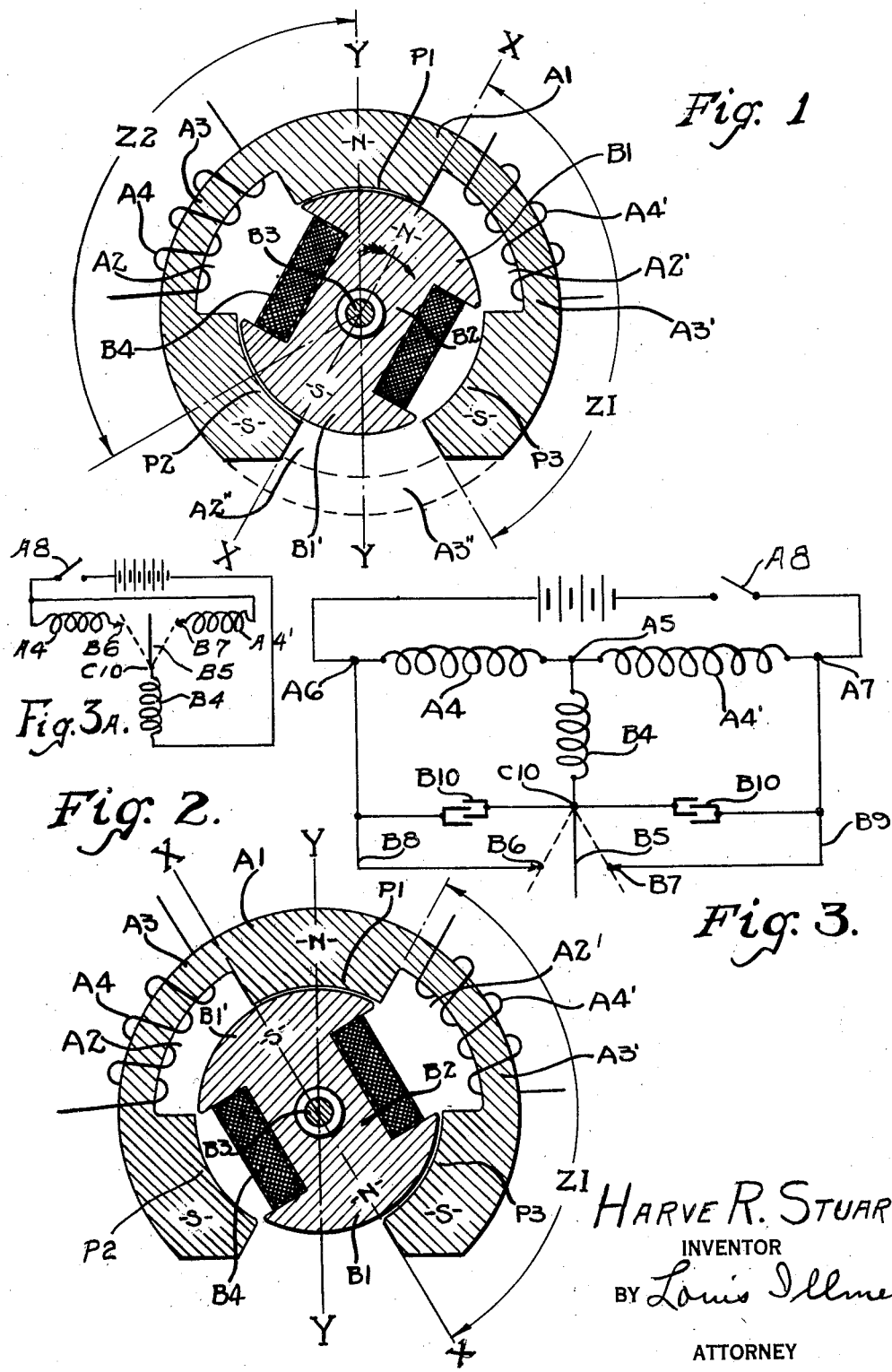

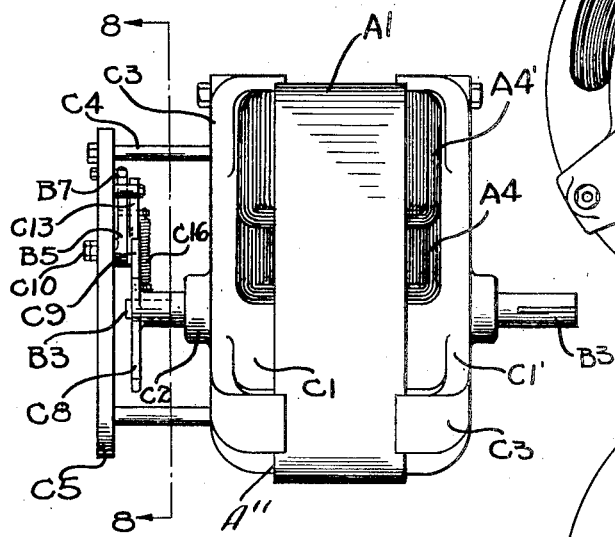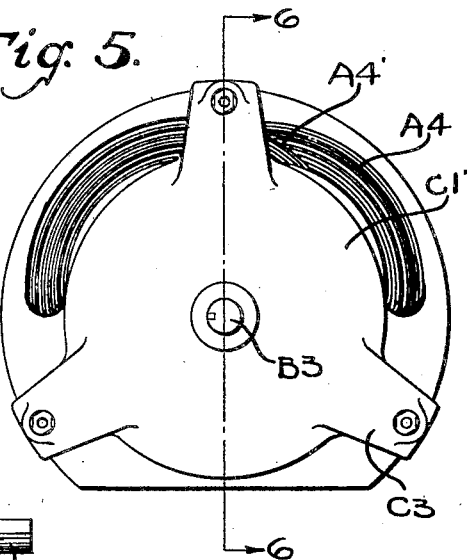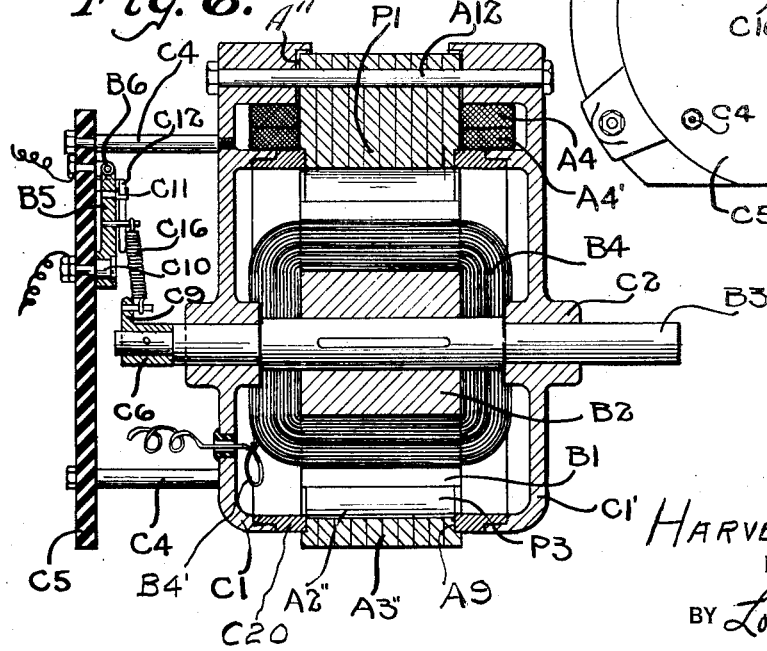

Sept. 1, 1931.  H. R. STUART  1,821,123
OSCILLATING MOTOR
Filed July 21, 1928  3 Sheets-Sheet 3
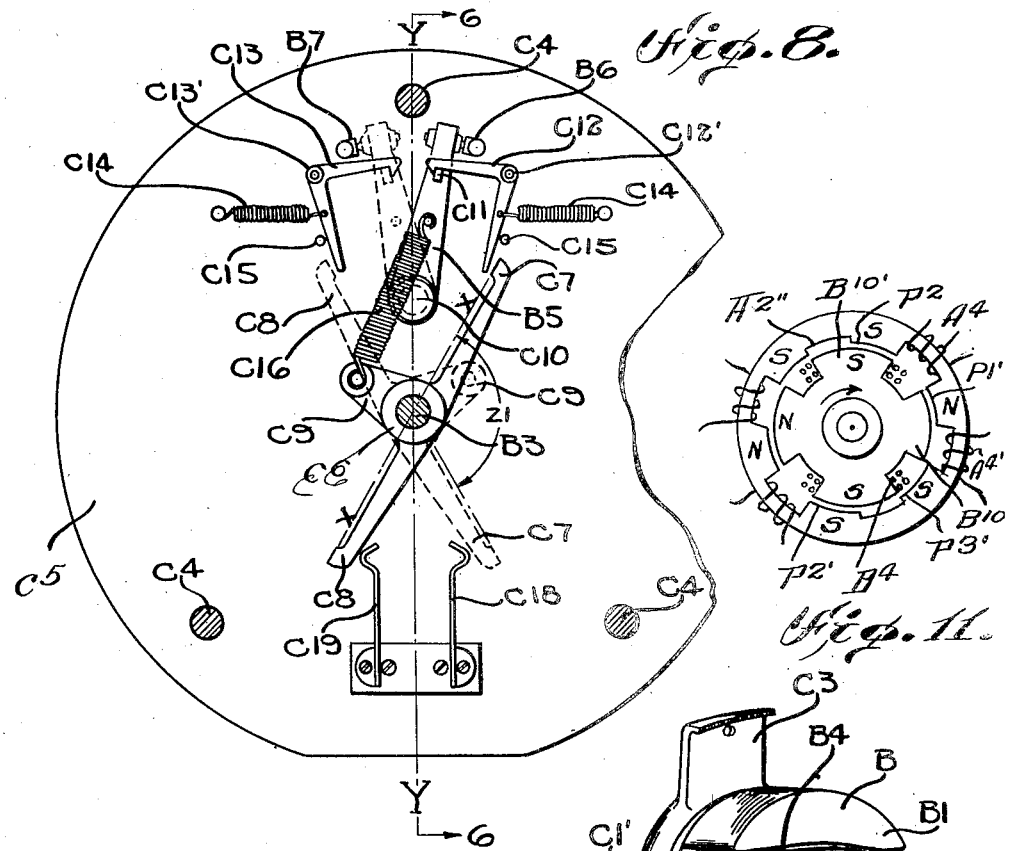
Fig. 8.
Fig. 11.
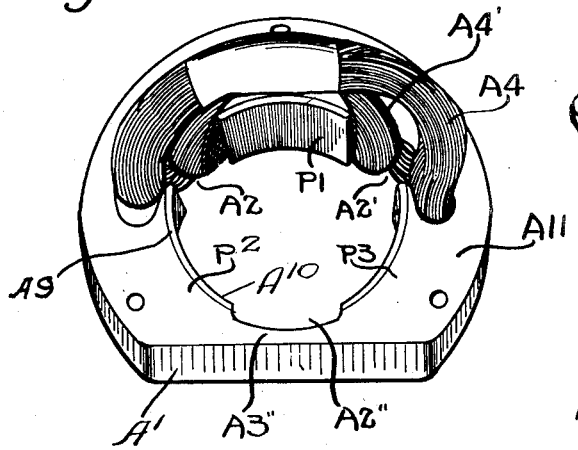
Fig. 9.
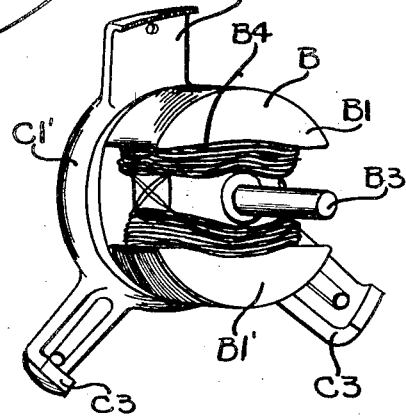
Fig. 10.
HARVE R. STUART.
INVENTOR
BY Louis Illmer
ATTORNEY

UNITED STATES PATENT OFFICE

HARVE R. STUART, OF SPRINGFIELD, OHIO

OSCILLATING MOTOR

Application filed July 21, 1928. Serial No. 294,482.

My invention relates to a novel magnetically operated actuating means and more particularly to an electric motor comprising two cooperative members mounted in oscillatory relation and each provided with one or more pairs of unlike electromagnetic pole faces that bring about an impelled reversible movement between the respective members as distinguished from a driving armature element of the conventional type that rotates continuously in one and the same direction.

The present apparatus works upon the principle of simultaneous attraction and repulsion between the respective pole pairs as contrasted to the more primitive oscillatory motor types that depend upon an intermittent magnetization of the poles or require the pull of certain poles to be rendered inoperative or neutralized before an effective pull can be exerted in the direction of armature movement. In the case of my motor, switch means preferably control the current reversal in the windings of only one pair of the aforesaid unlike pole faces while the polarity of the cooperating pair of pole faces remains unaltered.

As a further advance over the prior art, means are provided for bringing about a sustained magnetic pull by initiating a relative movement between my motor members and then following this up with a revitalizing supplementary impulse which enables the armature to rock through an unusually long-range swing without requiring flux reversal in either pair of pole faces. The cooperative disposition of the respective field and armature pole faces is such that the resulting relative movement is confined within reversible limits by the timely intervention of my switch means, and this in turn prevents the armature from reaching a neutral pull or stalling position lying immediately beyond each end region of oscillatory armature travel.

To this end, my improved motive device may be provided with a stationary field member of which the complementary pole piece faces are preferably bored and made to surround an armature. The polarity of the magnetic flux relations prevailing between the cooperating motor members may be shifted with the completion of each oscillatory stroke of my armature. The electromagnetic pole faces of my field member may be circumferentially distributed about the armature in an unevenly spaced relation and these are preferably but not necessarily made to cooperate with armature pole shoe faces that are evenly spaced and serve to throw my armature toward one or the other of its extreme oscillatory positions.

Reversal of the armature movement may thereupon be effected by changing the armature polarization with respect to that of the field in a synchronized relation. The interpolar disposition of my electromagnetized field pieces is preferably such that their respective face profiles assume a symmetrical relation with respect to the center-line of armature travel and thus provide for a substantially similar but inversely disposed initial pole face relation when the armature starts inwardly from either of its extreme swing positions.

The object of my invention is to devise a simple yet effective electrical apparatus of this character that may be operated by either direct or alternation current and adapted to impart movement to driven reciprocative machine parts without need of intermediary speed reducing gears, or the like. My oscillating motor is more particularly intended to serve as a power drive for various kinds of machinery such as washing machines, semaphore signal arms, pump plungers, adding machines, cash registers, winshield wipers, oscillating fans; likewise to periodically manipulate remote controls as applied to switches, circuit-breakers, fare registers, ticket vending machines, and many other similar purposes.

Embodied herein are also switch control means adapted to time the shifting period of my oscillating armature. In addition, other features of structure are disclosed which facilitate the manufacture and application of my motor device, all of which will be hereinafter described in detail.

Reference is had to the accompanying three sheets of drawings which illustrate a preferred embodiment of my invention; like characters of reference indicate like parts in the several views, and in which drawings:

Fig. 1 schematically indicates an elemental form of my invention showing a simple bipolar armature of the oscillatory type as mounted within a horseshoe-like field piece comprising one short pole span and one long split pole span and showing the armature positioned in one of its limit positions, while Fig. 2 shows a similar view with the armature swung into its opposite position of oscillation.

Fig. 3 is a representation of the wiring diagram pertaining thereto showing a parallel connection between field and armature coils; Fig. 3A represents an alternative diagram with said parts connected in series.

Fig. 4 is an elevational side view of a preferred embodiment in which the aforesaid field structure is replaced by an equivalent endless field piece of the unevenly spaced bipolar type with the armature rotatably mounted therein.

Fig. 5 represents an elevational rear or drive end view of Fig. 4, while Fig. 6 is a vertical sectional view of this assembled motor as taken along line 6—6 thereof.

Fig. 7 shows the commutating disc end of my preferred motor embodiment, and Fig. 8 is a detail of its assembled disc appurtenances as seen from line 8—8 of Fig. 4.

Fig. 9 is illustrative of the dismantled pole piece of said motor, while Fig. 10 shows in perspective a removed armature designed to cooperate therewith.

Fig. 11 schematically represents a modified type of my invention employing a multipolar field and a cooperating armature which operates in a manner essentially similar to that embodied in the more elemental bipolar form disclosed in Figs. 1 and 2.

In order to facilitate a clear disclosure of my invention, Figs. 1 and 2 show a schematic pole profile disposition which is intended to diagrammatically represent the principle of operation that underlies my oscillatory type of motor. The bored bipolar field piece A1 may be made to provide for one relatively short pole face or span length P1 and one relatively long split or double pole face as comprised in the complementary span lengths P2 and P3. The respective center-lines of the stipulated face lengths are for illustrative purposes, shown spaced at approximately 120 degrees and which virtual field pole pitch is designated by the angle Z2. Each such inturned pole piece may be internally bored to provide for a pair of circumferentially disposed field pole faces that are diametrically opposed at 180 electrical degrees displacement and adapted to magnetically cooperate with the cylindrical armature of the bipolar type such as B, of Fig. 10. Said short field pole, face P1 is kept separated from said split long pole faces P2—P3 by interpolar gaps such as A2 and A2'; in the present instance, each such gap is represented as being substantially equal in circumferential length to one of said pole pieces but which disposition, as will appear hereinafter, is not necessarily an essential feature.

As will be understood, any adjacent pair of pole pieces may respectively be adjoined through offset yoke members such as A3 or A3', and these may be wound in the usual manner by one or more field coils respectively designated as A4 and A4'; said coils may be connected in series and while running, are energized by any suitable source of either direct or alternating current in the fashion indicated by the wiring diagram Fig. 3. It will be observed that when the short field pole face P1 is given one magnetic polarity such for instance as north (marked N), that said complementary split pole faces P2 and P3 together constitute a single unlike pole that is subjected to opposite polarity, that is to say south (marked S). In the case of direct current operation, the field poles are preferably maintained under a fixed polarity while for alternating current, the instantaneous field polarity is kept in a fixed predetermined relation to that momentarily prevailing in the armature.

In one of its simpler forms, a drum-like bipolar type of armature may be utilized and as such may comprise two oppositely disposed pole shoes B1 and B1' interconnected through the yoke element B2 which latter may be suitably mounted to rotate upon the customary armature shaft F3 or the like. It is preferred to keep the pole tip spacing between said shoes substantially equal to one of the interpolar field gaps. Said armature type may further be provided with excitation coil B4 or its equivalent, of which the terminals are preferably connected in the parallel manner shown in Fig. 3.

Assuming the field coils A4 and A4' to have been interconnected in series at A5 and their respective free terminals A6 and A7 cut into the power circuit under the control of the switch A8, then one of the armature terminals may be spliced in at A5 which is the mid E. M. F. or potential point of said field coils and hence reduces the voltage across the armature coil B4 to approximately one-half of the line voltage. The complementary armature terminal is preferably carried to the contact arm B5 of a reversing switch or other suitable pole changing device adapted to alternately contact with the switch points B6 and B7 which are in turn, respectively connected to the power circuit at A6 and A7 through the complementary lines B8 and B9. The respective armature terminals may be carried through the duplex flexible cable B4' which is preferably looped to provide for unrestrained oscillatory movement on the part of the armature with the free cable end brought out through an insulator bush as indicated in Fig. 6. A condenser B10 for each of said switch points may be employed to eliminate undue sparking, although this is not a necessary expedient. My armature coil B4 may also be connected in series with said field coils A4 and A4' in accordance with the alternative wiring diagram shown in Fig. 3A; assuming both of said coils to be applied to the pole P1 in the assembled relation shown in Fig. 9 and that said coils are connected to reverse the polarity of the pole piece P1, then the armature may be alternately thrown in circuit with one or the other of said field coils through the medium of the switch arm B5.

The arcuate length of the described armature shoe face such as B1 may be made sufficiently long to substantially overlap one of said evenly spaced field pole faces such as P1 while at the same time bridging the adjacent air gap when reaching the extreme oscillatory relation indicated in Fig. 1. This critical angular disposition between the armature and the stationary field piece A1, approximately represents one of the travel positions at which it is preferred to bring about a reversal of armature movement. Assuming the switch arm B5 to have just been thrown over to make contact with the point B7 upon or shortly prior to reaching such predetermined limit of armature travel, then the resulting current passing through the coil B4 may be made to give a north magnetic polarization "N" to the armature shoe B1 and a contrary or south polarization "S" to the shoe B1' in the manner designated in Fig. 1. Under the then prevailing magnetic flux relations, a substantial torque is exerted that will thereupon cause the armature to reverse and rotate in a clockwise direction in accordance with the arrow of Fig. 1. It will be observed that at this instant, the pole faces P1 and P2 are in substantial balance as regards armature torque and that the initial turning impulse more largely results from a positive attraction on the part of the pole face P3 for the leading tip of the shoe B1 and from the simultaneous repulsion of the trailing tip of the shoe B1' by the same pole face P3.

By virtue of my improved pole face distribution, said initial magnetic impulse is followed up with a well maintained torque for the remainder of the armature swing. This effect is in part brought about through the use of the described uneven angular spacing of the interpolar gaps A2 and A2'. Whenever the armature swings clockwise out of the end position represented by Fig. 1 and its axis X—X assumes a medial or horizontal position, the leading tip of the shoe B1' will then have reached substantial alignment with respect to the leftward profile end of the top pole face P1; hence one of the armature shoe gaps will at that time assume a substantially similar straddled relation with respect to the pole face P1 that the opposite armature shoe gap initially held to the pole face P3, except that each of the interpolar gaps A2 and A2' are for the moment respectively bridged by an armature shoe. The initial torque impulse is now being augmented by attraction of the pole face P1 for the leading tip of the shoe B1' and this is in turn combined with a simultaneous repulsion on the part of the trailing tip of the shoe B1.

Thus without requiring current reversal in either the field or the armature coils during the latter portion of its swing, my movable member is given an intermediate supplementary impulse that carries the same onward against load resistance into the other of its predetermined extreme positions, whereupon the armature shoe tips are preferably brought to rest in a certain registering and reversible position relative to a terminal of the surrounding field pole face profiles. Such revitalized magnetic impulse applied during each and every armature swing period, serves effectively to sustain the initial torque impulse, which latter would otherwise be likely to wane perceptibly after the armature has moved away from either of its extreme swing positions.

Assuming the flux relations to remain as in Fig. 1, then after the armature is allowed to approach its other limit of clockwise oscillatory travel that is represented by Fig. 2, the leading edge of the shoe B1 will be attracted by the pole face P2 and the trailing edge of the shoe B1' will at that time be repulsed by this same pole face P2 while the torque effect of the poles P1 and P3 are here again brought into a characteristic balanced relation. During any such armature movement, its yoke axis X—X tends to approach but is purposely not allowed to align with the vertical center line Y—Y of the stationary field magnet A1, for the reason that such neutral point corresponds to a dead center position at which the reluctance of the magnetic circuit through the armature becomes a minimum, thus leaving no effective torque available for reversing purposes. The gainful swing may be made greater than the normal field pole pitch angle Z2 but is preferably confined to an angle of somewhat less than 180 degrees in order to obviate possible stalling of the armature. In practice, the loaded armature movement may be held within a restricted swing such as the angle Z1 for instance, by a timely shift on the part of the switch contact arm B5 from the point B7 to B6, (see Fig. 8 and description thereof) whereby reversal of armature current is brought about.

When approaching the end of the predetermined angular swing shown in Fig. 2, the armature prior to the throwing of said switch arm, still tends to move onward in a clockwise direction. Upon the shifting of said switch, the reversed magnetic flux relations will set up a counter-clockwise armature movement and cause the now trailing tip of the shoe B1 to be repulsed by the pole face P2 and the leading tip of the shoe B1' to be simultaneously attracted by the pole face P2 in a substantially similar but reverse fashion from that described in connection with Fig. 1 and this serves to return the armature into its original or other extreme swing position. By virtue of the various means described, I am enabled to exert a sustained long-range magnetic pull throughout each of the successive oscillatory movements of my armature; the resulting oscillations are capable of efficiently converting the consumed electric power into available mechanical work. As will appear presently, provision is also made for automatically synchronizing the switch reversal with the armature movements which in turn allows the armature to oscillate in a regular period for any given structural relations, load conditions, magnetic density, and the like.

As applied to certain purposes, it may be found desirable to impart intermittent single or one way drive strokes to my armature and it may also be expedient to provide for a set of positive stop means of the buffer type such as C18 and C19 adapted to prevent overtravel by fixedly terminating or cushioning the armature stroke in either direction of oscillatory travel in the manner disclosed in Fig. 8.

Referring now to the embodiment of my motor disclosed in Figs. 5 to 10 inclusive, this may likewise be designed to operate with a regular oscillatory period. For tructural reasons, it is here preferred to bridge or otherwise merge the aforesaid complementary split field pole faces in the manner represented in Fig. 9; this modified field disposition is still virtually identical in effect with the alternative form previously described where the pole faces P2 and P3 may be tied together by the yoke A3'' (indicated in Fig. 1 by dotted and dashed lines) without basically altering the resulting magnetic flux relations as applied to present purposes. If desired, the yoke offset may be further reduced to provide for only a partial or secondary interpolar gap A2'' as shown in Fig. 9. This modified or bipolar field member would in such even essentially require but two interpolar gaps A2 and A2' to separate the bored pole faces and these gaps may or may not be unequally spaced around the armature shaft axis.

The disposition of the field windings may be modified somewhat over that shown in Fig. 1, and in the present instance, two separately wound and inserted coils may be made to span said interpolar gaps in the offset superimposed relation shown in Fig. 9. It is to be understood that any suitable style of field winding may be resorted to but that said inserted double coils facilitate making the cited connection at A5 intermediate the coil terminals in accordance with the diagram Fig. 3 when the armature electromotive force is to be reduced to about one half of that prevailing across the line terminal A6—A7. This expedient is however not essential in so far as an equivalent single field coil might be connected directly across said line terminals, with the armature also shunted thereacross under control of a suitable double pole timing or reversing switch (not shown).

Regarding the mechanical features associated with the mounting of my armature into the endless field piece shown in Fig. 9, the latter is equipt with a bore that is here shown as divided by the interpolar gaps A2 and A2' into a short peripheral span length comprising the pole face P1 and into a relatively long peripheral span length made up of the double normal or adjoined pole faces P2 and P3, which latter is shown as parted by the secondary or non-interpolar gap such as A2''. My stationary field magnet is preferably provided with opposite flat annular end faces such as A11 for mounting the respective armature housings.

As will appear from Fig. 6, said opposite field faces respectively carry the forward bearing bracket C1 and the rear bearing bracket C1', which may each be provided with a shaft hub C2 carried by arms such as C3 that are centered to one of the field faces and held in place by through bolts such as A12. The forward housing or bracket C1 may further be equipt with a plurality of stanchions C4 serving to hold an insulator disc C5 in spaced relation to the front field face A11, as shown. The endless field piece A1 is preferably built up of laminated soft iron plates and riveted together into a unitary structure, which in turn is bored and squared up as shown in Figure 6, the radially faced end plates thereof being respectively provided with an oppositely disposed counterbored centering groove A9 adapted to snugly receive a nonmagnetic pilot ring or lug C20 as carried by one of the motor bracket heads.

The disc end of the armature shaft B3 may be extended through the hub of the bracket C1 to fixedly carry a dog-like timing lever C6 of which the respective ends are shaped into the upturned release members C7 and C8; these oppositely disposed tappets are made to rock in unison with the armature oscillation and are intended to swing between the full and dotted lined positions depicted in Fig. 8. Intermediate said lever ends, there is shown an integral throw crank C9 that is preferably set in quadrature relation to the armature yoke axis X—X and adapted to actuate the control switch B5 through the medium of a quick throw mechanism. Fig. 6 shows a suitable spring actuated snap switch assembly of this kind. Said insulator disc C5 may be made to carry the contact arm B5 mounted upon the swivel terminal post C10 and arranged to alternately swing between the spaced contact points B6 and B7; these switch elements are assumed to be connected for reversal of the armature current, as described.

Said arm B5 may further be provided with a trip block C11 adapted in one extreme of its travel, to engage and interlock with the hook end of the detent bell-crank lever C12 as fulcrumed at C12'. As indicated in Fig. 8, the complementary detent bell-crank lever C13 as fulcrumed at C13', will then be disengaged. The depending arm of each such bell-crank may be served by a separate return spring C14 and a stoppin C15 therefor, adapted to bring the respective lever hook ends into proper alignment for reengagement with the reciprocative block C11. Upon release of either of said lever hooks, the contact arm B5 will thereupon be rapidly thrown over into its opposite position owing to tension exerted by the throw spring C16, which for present purposes may be stretched between an intermediate portion of the contact arm B5 and the overhung pin carried by said crank, Assuming the armature to have approached one limit of its oscillatory travel corresponding to the position shown in Fig. 1 but that it still continues to move onward in counter-clockwise fashion, that is to say in a direction contrary to the arrow, then the trigger end C7 of the timing lever C6 will have been swung up into its full-lined position and is about to strike the lower depending end of the detent bell crank lever C12; further armature movement thereupon causes the hook end of said lever C12 to lift, which releases the trip block C11. In accordance with Fig. 8, the crank C9 has in the meantime been thrown leftward of the contact arm fulcrum C10 whereby the tensioned spring C16 is made to exert a leftward shifting effort upon the pivoted contact arm. Hence upon releasing of the trip block C11, the switch arm B5 will be rapidly thrown into contact with the opposite point B7 and the block C11 will be caught and become interlocked with the complementary hook that is carried by the detent lever C13.

As a result of shifting said contact arm, the armature movement will be reversed in the manner hereinbefore described in connection with Fig. 1. When such continued clockwise movement causes the armature to approach its other extreme position represented in Fig. 2, the opposite trigger end C8 of the lever C6 will then assume the dotted position shown in Fig. 8 while the crank C9 will at that time be shifted into an opposed relation with respect to the fulcrum C10 and be prepared rapidly to throw the contact arm B5 back into its original position as shown in full lines.

Reference to Fig. 11 will show that the basic principles underlying my motive device need not be confined to the use of a simple bipolar armature but may likewise be extended to include a multipolar armature working in conjunction with a suitable field piece. In the given example, a four pole armature is made to furnish double pairs of complementary pole faces such as B10 and B10' while the cooperating field piece is provided with plural pole faces of the kind designated by P1' and also the split pole faces P2' and P3', it being understood that the respective pole piece windings are to be so disposed that they will set up the indicated unlike polarities.

While a preferred embodiment of my invention has been set forth in detail, it is to be understood that its outstanding novel features are subject to rather wide latitude in practical application; it is not essential that the respective field pole face profiles shall in all cases be made of uneven length; also the resulting magnetic torque effects may be utilized in an inverse manner, namely by holding the armature stationary and allowing the field piece to bodily oscillate relative thereto; and that various other changes in the details of my motor structure or armature reversal controls may be resorted to, all without departing from the spirit and scope of my invention, heretofore described and more particularly pointed out in the appended claims.

What I claim as my invention is:

1. A motive device comprising two cooperative electromagnetized members mounted for relative oscillatory movement, a pair of unlike pole faces for one of said members which faces are circumferentially disposed in diametrically opposed relation and parted by complementary interpolar gaps to constitute a relatively short pole face profile and a relatively long pole face profile, the other of said members providing a pair of spaced diametrically opposite pole shoe faces each having a span length greater than that of one interpole gap such that in an extreme oscillatory position between said members, one of said shoe faces alone bridges one of said interpolar gaps while in the opposite extreme oscillatory position, the other of said shoe faces alone bridges the other of said gaps, and switch means for controlling the flow of energizing current to the windings of one such member serving to reverse the relative movement of the aforesaid members.

2. An electric actuating device comprising two cooperative members mounted for relative oscillatory movement, a pair of unlike electromagnetized pole faces for one of said members which faces are parted by complementary interpolar gaps to constitute a relatively short pole face span length and a relatively long pole face span length, and the other of said members providing a pair of spaced pole shoe faces each having a span length not less than that of the aforesaid short pole face plus one of its contiguous gaps, the pole face disposition between the respective members being such that in an extreme oscillatory position one of said shoe faces alone substantially bridges one of said gaps and in the opposite extreme oscillatory position, the other of said shoe faces alone substantially bridges the other of said gaps, and switch means for reversing the energizing current to the windings of one such member.

3. An electric actuating device comprising two members mounted for relative oscillatory movement, complementary electromagnetized pole faces for one of said members which faces are circumferentially disposed and respectively parted by interpolar gaps to constitute a relatively short pole face span length and a relatively long pole face span of not less than semi-circular length, and pole face means for the other of said members adapted to magnetically cooperate with the aforesaid unequal face span lengths and thereby obtain the maximum amount of oscillatory movement.

4. An electric motor comprising two cooperative members mounted for relative oscillatory movement within predetermined limits, a pair of unlike electromagnetized pole faces for one of said members which faces are circumferentially disposed and parted by complementary interpolar gaps to constitute a relatively short pole profile length and a relatively long pole profile length, said gaps being oppositely disposed with respect to a critical reference line interconnecting the respective medial regions of the aforesaid profile lengths, and the other of said members providing a pair of spaced pole shoe faces adapted to alternately swing into overlapping relation with the aforesaid short pole profile and tending to approach a symmetrically straddled relation with respect to said line, and control means serving to initiate a shoe swing toward said line and which control means include means for terminating each such swing prior to allowing either shoe to reach said straddled relation.

5. An electric motor comprising a stationary and a cooperative movable member mounted for relative oscillatory movement within predetermined limits, a pair of unlike electromagnetized pole faces for one of said members which faces are parted by interpolar gaps to constitute a relatively short pole face span and an adjacent relatively long pole face span, the other of said members having a pair of spaced pole shoe faces adapted to alternately move into overlapping relation with the aforesaid short pole face span, the respective face dispositions being such as to provide for a substantially neutral position of magnetic pull in the direction of relative movement, and control means serving to prevent said movable member from reaching said neutral pull position.

6. An electric motive device comprising two members mounted for relative oscillatory movement within predetermined limits, a pair of electromagnetized pole faces for one of said members which faces are circumferentially disposed and respectively parted by gaps to constitute a relatively long pole face profile and a relatively short pole face profile, an electromagnetized pole shoe face having spaced pole tips for the other member which shoe face is adapted alternately to overlappingly cooperate with the pair of pole face profiles of said one member, and cause a shoe face tip to approach registry with an end of one of the aforesaid face profiles, and means shifting the polarity of one such member prior to reaching the aforesaid end registry.

7. An electric motor comprising two members mounted for relative oscillatory movement within predetermined limits, a pair of unlike electromagnetized pole faces for one such member, said faces being circumferentially disposed and parted by complementary interpolar gaps serving to terminate the respective face profiles, a pair of unlike electromagnetized pole shoe faces for the other member, each such shoe face being provided with tips having a span length therebetween approximately equal to one of the aforesaid face profiles plus one of the interpolar gaps contiguous thereto and which pole shoes are kept spaced apart by a distance substantially equal to one of the gaps separating the aforesaid face profiles.

8. In an electric motor comprising two cooperative members mounted for relative oscillatory movement, the combination of a pair of electromagnetized pole face means for one of said members which faces are circumferentially disposed and respectively parted by interpolar gaps to constitute a relatively short pole face span and an adjacent relatively long pole face span, current supply terminals, a field coil for the aforesaid poles connected directly across said terminals and providing for a splicing point intermediate the field coil ends, an armature, an armature excitation coil having one end connected into said splicing point, and a switch for controlling the other armature coil end and serving to reverse the current flow therethrough.

9. An electric motor comprising a stationary member and an armature therefor mounted to swing in oscillatory relation, a pair of electromagnetized pole face means for said stationary member which faces are circumferentially disposed and respectively parted by interpolar gaps, an armature member providing a pair of electromagnetized pole pieces, an excitation coil, means for controlling the current flow through said coil, said means comprising a switch of the releasable quick-throw type, and means actuated in unison with the armature movements serving to release said switch whenever the armature closely approaches one of its predetermined swing limits.

10. An electric motor comprising a stationary and a movable member mounted to swing in oscillatory relation, a pair of unlike electromagnetized pole face means for one of said members which faces are circumferentially disposed and respectively parted by complementary interpolar gaps to constitute a relatively short face span length and a relatively long face span length, a pair of electromagnetized pole face means for the other of said members, said faces being cooperatively disposed with respect to the first named uneven pole face lengths and adapted upon flux reversal in one such pair of faces to impart an oscillatory movement therebetween, switch means for shifting the magnetic polarity of one such member, and buffer-like stop means serving to fixedly limit the resulting movement between said members.

11. An electric motor comprising a stationary field member and an armature mounted to swing in oscillatory relation, a pair of electromagnetized pole faces for the field member, said faces being circumferentially disposed and respectively parted by complementary interpolar gaps to constitute a relatively long pole face and a relatively short pole face, a pair of spaced pole shoe faces for the armature, said shoe faces being cooperatively disposed with respect to the first named pair of pole faces and adapted upon flux reversal in one such pair of faces to impart an oscillatory movement therebetween, and a field coil embracing the aforesaid relatively short pole face and serving to oppositely polarize said long pole face.

12. In an electromotive device comprising two members mounted for relative movement, the combination of a pair of unlike pole pieces for one of said members disposed to constitute a relatively short pole face profile length and a spaced relatively long pole face profile length, a pair of cooperating electromagnetized pole shoe faces for the other member of which one such shoe face is given a profile length that is longer than the aforesaid short pole face profile and which one shoe face is so disposed as to initiate a relative movement between said members serving to bring a shoe tip thereof into substantial registry with an end of the short face profile and thereby setting up a revitalized impetus in the direction of initial movement, and switch means for reversing the magnetization of one such member and which means are actuated after said impetus has become effective.

13. In an electric actuating device adapted to pull against load resistance and comprising two members mounted for relative oscillatory movement, the combination of a pair of unlike electromagnetized pole face means for one of said members which faces are respectively parted by complementary interpolar gaps to constitute a relatively short profile length and a relatively long profile length, a pair of spaced unlike electromagnetized shoe pole face means for the other of said members each such shoe face having a profile length that is longer than either of said gaps and which shoe faces are disposed respectively to bridge one of said complementary gaps in an intermediate position of relative movement and to cooperate with the aforesaid short profile lengths in exerting a sustained power delivery pull therebetween in the direction of movement, and switch means reversing the magnetic polarity of one pair of pole faces with respect to the other pair of pole faces while the polarity of said other pair of pole faces remains unaltered.

14. An electric motor comprising a field member and a driving armature member mounted for relative oscillatory movement between predetermined limits, of which the field member is provided with a pair of unlike pole face profiles that are respectively parted by interpolar gaps and of which the armature member is equipt with a pair of cooperating unlike electromagnetized shoe pole faces so spaced that in a medial position of movement between said members a leading shoe face tip of one shoe pole face and a lagging shoe face tip of the other shoe pole face will respectively approach registry with the opposite profile ends of one such field pole faces and produce a revitalized power impulse in the direction of movement while the polarity of both of the aforesaid pairs of pole faces is kept in fixed relation.

In testimony whereof I have hereunto set my hand this 18th day of July, 1928.

HARVE R. STUART.